(12) United States Patent
Ciszak et al.

(10) Patent No.: US 8,365,866 B2
(45) Date of Patent: Feb. 5, 2013

(54) INTERNAL LUBRICATION FOR A GEARBOX, A POWER-GENERATING WIND TURBINE SYSTEM, AND A POWER-GENERATING SYSTEM

(75) Inventors: Robert John Ciszak, Fairview, PA (US); Keith Marsden, Erie, PA (US); Timothy Kuzma, Cransville, PA (US)

(73) Assignee: General Electric Company, Schenectady, NY (US)

(*) Notice: Subject to any disclaimer, the term of this patent is extended or adjusted under 35 U.S.C. 154(b) by 942 days.

(21) Appl. No.: 12/342,947

(22) Filed: Dec. 23, 2008

(65) Prior Publication Data

US 2010/0007151 A1    Jan. 14, 2010

Related U.S. Application Data

(60) Provisional application No. 61/079,788, filed on Jul. 10, 2008.

(51) Int. Cl.
*H02K 7/116* (2006.01)

(52) U.S. Cl. .............. 184/6.12; 184/4; 475/175; 290/55

(58) Field of Classification Search ............. 184/4, 6.11, 184/6.12, 27.1, 27.2; 475/159; 290/55; 416/1–248
See application file for complete search history.

(56) References Cited

U.S. PATENT DOCUMENTS

| | | | |
|---|---|---|---|
| 6,494,806 B2 * | 12/2002 | Tsukada et al. | 476/8 |
| 6,759,758 B2 | 7/2004 | Martinez | |
| 7,323,792 B2 | 1/2008 | Sohn | |
| 7,431,567 B1 | 10/2008 | Bevington et al. | |
| 7,662,059 B2 * | 2/2010 | McCune | 475/159 |
| 2009/0246021 A1 * | 10/2009 | Fric et al. | 416/43 |
| 2010/0052442 A1 * | 3/2010 | Savant | 310/78 |

* cited by examiner

*Primary Examiner* — Michael Mansen
*Assistant Examiner* — Robert T Reese
(74) *Attorney, Agent, or Firm* — Shawn McClintic; Alleman Hall McCoy Russell & Tuttle LLP

(57) ABSTRACT

A gearbox including a gear-train including an input and an output and a rotating conduit internally traversing the gear-train is provided. The rotating conduit is configured to receive lubrication fluid from one or more components downstream of the rotating conduit and deliver lubrication fluid to one or more components upstream of the rotating conduit. The components downstream of the rotating conduit rotate at a different speed than components upstream of the rotating conduit.

10 Claims, 4 Drawing Sheets

US 8,365,866 B2

INTERNAL LUBRICATION FOR A GEARBOX, A POWER-GENERATING WIND TURBINE SYSTEM, AND A POWER-GENERATING SYSTEM

CROSS REFERENCE TO RELATED APPLICATIONS

The present application claims priority to U.S. Provisional Patent Application Ser. No. 61/079,788 entitled "WIND TURBINE INTERNAL LUBRICATION SYSTEM", filed Jul. 10, 2008, the disclosure of which is hereby incorporated by reference.

BACKGROUND

The wind turbine industry has been experiencing unprecedented growth in recent years due to the increasing need for clean renewable energy in the face of a myriad of environmental problems. Wind turbine manufactures are seeking lower cost wind turbines with increased efficiency and longevity to compete with non-renewable energy sources, such as coal fired power plants. Lubrication systems are used in many wind turbines to circulate oil through the gearbox. The lubrication system may decrease the friction between moving components as well as providing cooling for components within the gearbox, thereby decreasing the losses within the gearbox and increasing the lifespan of the wind turbine.

Many previous lubrication systems have made attempts to externally route oil lines through the outer housing of the gearbox to provide lubrication fluid to various rotating components in the gearbox, such as bearing and gear meshes in an upwind portion of the gearbox. However, due to the large size of the components included in the gearbox and the small diameters of the oil lines, the oil lines may become damaged, and in some cases, ruptured during installation and/or repair of up-tower components. Therefore, the cost of installation and repair may be increased. Additionally, degradation or possible failure of the gearbox may occur when ruptured oil lines are not discovered. Furthermore, externally directing oil lines into various internal components within the gearbox may be difficult, due to the gearbox's compact design. Therefore, proper lubrication of the gearbox may not be achieved when using external oil lines, thereby decreasing the lifespan of the gearbox.

BRIEF DESCRIPTION OF THE INVENTION

The inventors have recognized the above issues as well as solutions to the above issues. One approach provides a gearbox comprising a gear-train including an input and an output, and a rotating conduit internally traversing the gear-train. The rotating conduit is configured to receive lubrication fluid from one or more components downstream of the rotating conduit, and deliver lubrication fluid to one or more components upstream of the rotating conduit. Additionally, the components upstream of the rotating conduit may rotate at a different speed than components downstream of the rotating conduit.

In this way, increased lubrication may be provided to the gearbox while simplifying installation and repair procedures, thereby increasing the longevity of the wind turbine and driving down the cost of the wind turbine.

This brief description is provided to introduce a selection of concepts in a simplified form that are further described below in the Detailed Description. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

The present invention will be better understood from reading the following description of non-limiting embodiments, with reference to the attached drawings, wherein below.

DETAILED DESCRIPTION

A lubrication system for a power-generating wind turbine is disclosed herein. The lubrication system may internally direct oil to various components included in a gearbox of the wind turbine, thereby increasing the lubrication provided to the components, and decreasing the likelihood of rupturing an external lubrication line during installation and repair. The disclosed lubrication system is described with regard to a wind turbine. However, it can be appreciated that the lubrication system may be applied to other suitable gearboxes outside of the wind energy sector, such as gearboxes used in the mining industry. Before describing the lubrication system in detail, a suitable operating environment in which the lubrication system may be used is described with regard to FIGS. 1-2.

Figure 1:
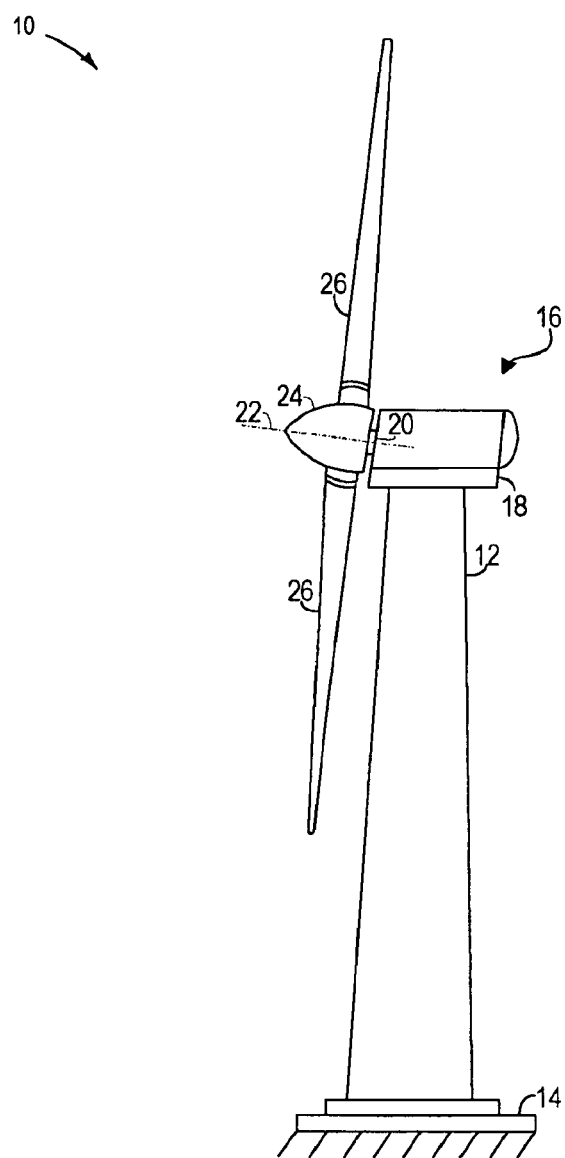
FIG. 1 shows an illustration of a power-generating wind turbine.

A power-generating wind turbine 10 is shown in FIG. 1. The wind turbine includes a tower 12 extending substantially vertically out of a base 14. The tower may be constructed from a plurality of stacked components. However, it can be appreciated that alternate configurations of the tower are possible, such as a lattice tower. A nacelle 16 and nacelle bedplate 18 are positioned atop the tower. A drive unit (not shown) may be included in the nacelle bedplate, allowing the nacelle to rotate about a horizontal plane. The wind turbine may be positioned, via the drive unit, directly into the wind, increasing the power output of the wind turbine. Further, in some examples, the drive unit may also control the vertical pitch of the nacelle. The nacelle houses a power generation system having a gearbox and a generator, shown in FIG. 2 and discussed in greater detail herein.

In one example, the wind turbine is positioned with the rotor head pointed into the wind. Thus, upwind refers to a longitudinal direction pointing from the generator toward the rotor blades and downwind refers to the opposite direction. Furthermore, upwind and downwind components may be used to define the relative position of components included in the wind turbine.

Continuing with FIG. 1, a main shaft 20 may extend out of the nacelle and the gearbox sharing a common central axis 22.

The main shaft 20 may be coupled to a rotor head 24. A plurality of rotor blades 26 may be radially positioned around the rotor head 24. A wind force (not shown) may act on the rotor blades, rotating the blades about the central axis. Furthermore, the rotor head may be configured to reduce drag on the wind turbine, thereby reducing the thrust load on bearings in the wind turbine.

Figure 2:
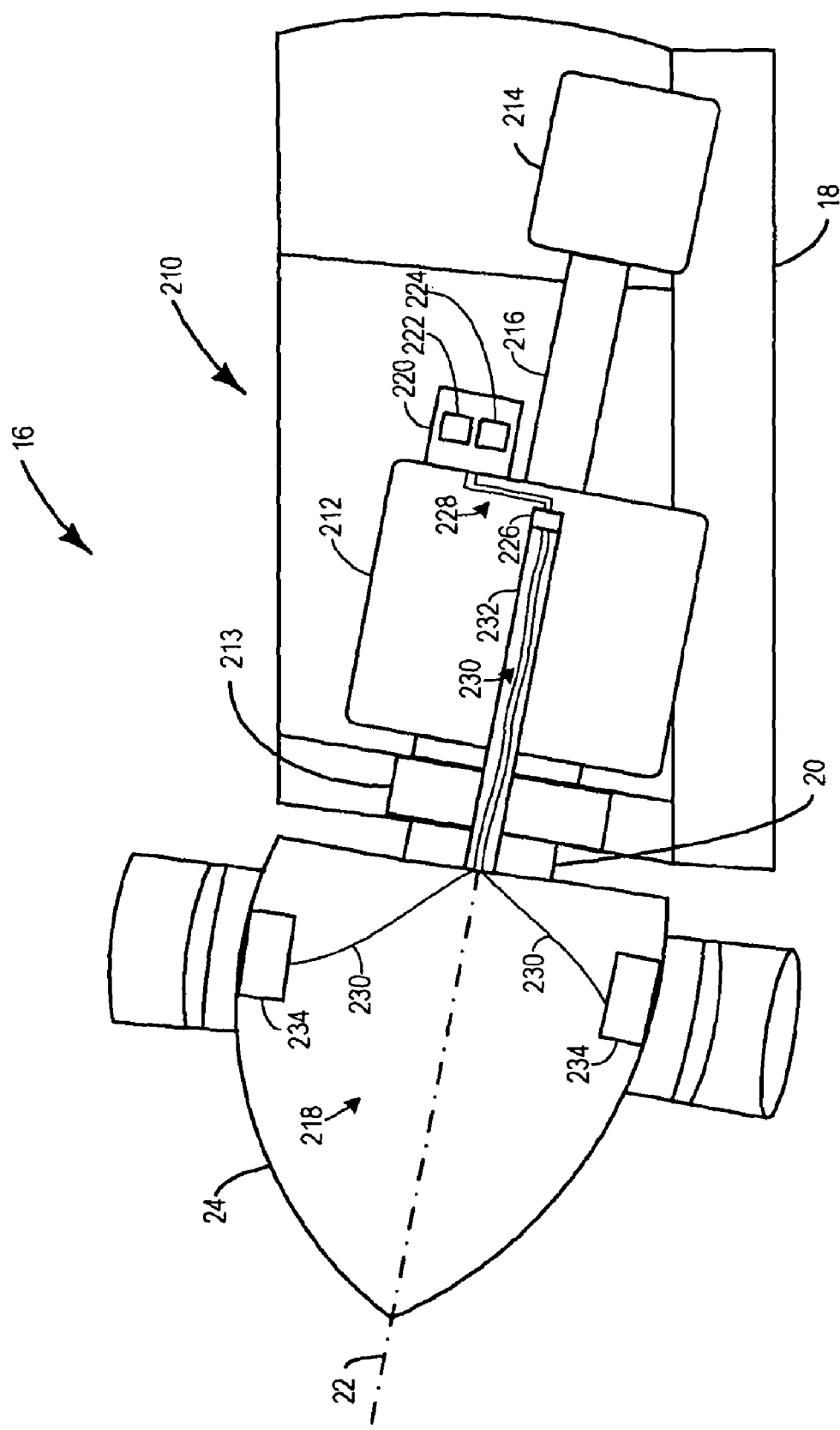
FIG. 2 illustrates a schematic depiction of a nacelle, according to an embodiment of the present invention, included in the power-generating wind turbine shown in FIG. 1.

A more detailed illustration of the nacelle 16 is shown in FIG. 2. The nacelle 16 houses the power generation system 210, allowing wind force to be converted into electrical energy. The power-generating system may include a gearbox 212 having an input and an output. The input may be coupled to, and may receive rotational input from, the rotor head 24. An input bearing 213, such as a roller bearing, may be provided within the nacelle, allowing a rotational input to be transferred to various components within the gearbox. The input may include a torque coupling, included in an input carrier, discussed in more detail herein with regard to FIG. 3. The gearbox may be configured to adjust the speed of a rotational input from the rotor head. Furthermore, the output of the gearbox may be coupled to a generator 214 and configured to convert mechanical energy from the output into electrical energy. A suitable output device, such as an output shaft 216, may couple the output of the gearbox to the generator.

The generator 214 may be coupled to an electrical transmission system (not shown) which may be routed through the tower to the base of the wind turbine. Various types of generators may be used in the wind turbine, such as an induction type, wound type, synchronous type, secondary resistance control wound induction type (rotor current control or RCC type), secondary excitation control wound induction type (static Scherbius or D.F. type), permanent magnet type, induction multiple type, etc.

Moreover, a pitch control system 218 may be included in the nacelle. The pitch control system may include a controller 220. In this example, the controller may be coupled to a rear portion of the gearbox. However, in other examples, the controller may be located in another suitable location, such as the bedplate of the nacelle. The controller may include a processing unit 222, memory 224 such as Random Access Memory (RAM) and Read Only Memory (ROM), and/or other suitable components.

Continuing with FIG. 2, stationary electrical wires 228 may electrically couple the controller 220 to a slip ring 226, included in the pitch control system 218. The slip ring may be configured to transfer electricity from a stationary state into a rotating state. In this way, the slip ring may act as an interface between the stationary electrical wires 228 and the rotating electrical wires 230. The rotating electrical wires may be enclosed by a pitch tube 232 or other suitable rotating conduits which internally traverse the gearbox. Therefore various gears included in the gearbox may be arranged around the pitch tube. Furthermore, the pitch tube and/or rotating electrical wires may rotate at the same speed as the rotor head. Additionally, the pitch tube may also contain a lubrication channel internally traversing the gearbox, included in a lubrication system, as discussed in more detail herein with regard to FIGS. 3A-3E. In other examples, it can be appreciated that additional or alternate pitch control lines, such as hydraulic lines, may be directed through the pitch tube.

The rotating electrical wires 230 may be coupled to one or more pitch control mechanisms 234 located within the rotor head. The pitch control mechanisms may be configured to adjust the pitch of one or more rotor blades. In this way, the rotor blades may be adjusted to optimize the power output of the wind turbine.

Figures 3C, 3D:
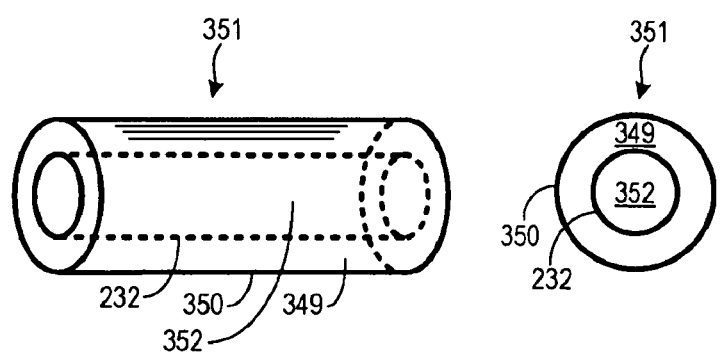
FIGS. 3C and 3D shows various views of a tube-in-tube assembly included in the gearbox shown in FIG. 3A.
Figure 3A:
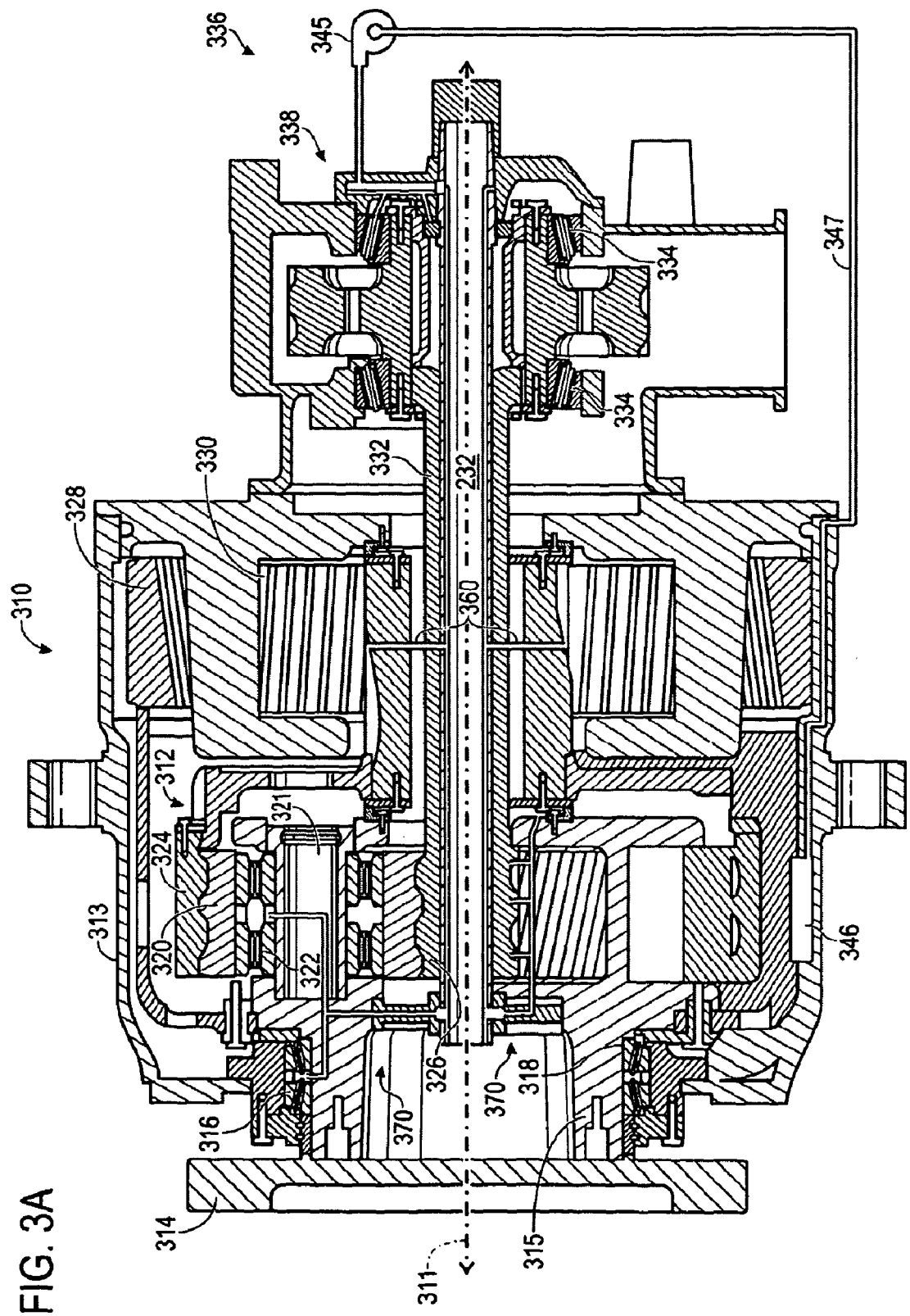
FIG. 3A shows a cut-away view of a gearbox and associated lubrication system included in a wind turbine, according to an embodiment of the present invention.

FIG. 3A illustrates a schematic depiction of a differential planetary gearbox 310 having a central axis of rotation 311. The differential planetary gearbox 310 may be utilized in the power-generating wind turbine, shown in FIGS. 1 and 2. However, it can be appreciated that alternate gearboxes may be used in the power-generating wind turbine illustrated in FIGS. 1 and 2, such as a simple planetary gearbox, compound planetary gearbox, etc. Additionally, various gearboxes currently in production may be used, such as the GE Wind Energy 2.5×1, Fuhrlander FL2500, and/or Unison U88 and U93. The differential planetary gearbox 310 may include a lubrication system 336 configured to internally deliver oil to various components within the gearbox. In this way, oil may be effectively delivered to the gearbox, increasing lubrication and/or cooling in the gearbox, and avoiding potential degradation of the lubrication lines due to human error during installation, repair, etc. The lubrication system and its various benefits are discussed in more detail herein. It can be appreciated that other suitable lubrication fluids may be used, such as synthetic oils, silicon based lubricants, or a combination thereof.

The gearbox 310 may include a gear-train 312 at least partially enclosed by a housing 313. The gear-train may include a torque coupling 314 which may be included in an input carrier 315. As discussed above, the wind driven rotor head may be coupled to the torque coupling through suitable attachment mechanisms, such as bolts, screws, etc. An input bearing 316, or bearing set, configured to facilitate rotation of the input carrier, may be positioned on an exterior surface 318 of the input carrier. In some examples, the input bearing may be a suitable bearing, such as a tapered roller bearing, allowing the bearing to accept the majority of the thrust, axial, and bending loads, thereby eliminating the gearbox as a structural member of the power-generating wind turbine. It can be appreciated that other types of bearings may be utilized such as a double row tapered roller bearing, a non-tapered roller bearing, etc.

An upwind set of planet gears 320 may be coupled to the input carrier 315 through planet pinions 321. Herein, the input carrier may drive the upwind set of planet gears in an orbital rotation. It can be appreciated that a set may include one or more components. The upwind set of planet gears may include corresponding upwind planet bearings 322 (or bearing set). In this example, a fixed upwind ring gear 324 may be coupled to the upwind planet gears through meshing engagement, directing the rotation of the upwind set of planet gears. However, in other examples, the upwind ring gear 324 may not be included in the gear-train. Additionally, the upwind set of planet gears 320 may be in meshing engagement with a sun gear 326.

The input carrier 315 may also be fixedly coupled to a downwind ring gear 328. The downwind ring gear may be in meshing engagement with a downwind set of planet gears 330. The downwind set of planet gears 330 may also be in meshing engagement with the sun gear 326. In some examples, the downwind set of planet gears 330 and the upwind set of planet gears 320 may be rotatably coupled. However, in other examples, the downwind set of planet gears and the upwind set of planet gears may not be rotatably coupled. Further, in some examples, at least a portion of the aforementioned meshing engagements in the gear-train may be helical. Each downwind planet gear may include a corresponding downwind planet bearing (not shown), facilitating rotation of the downwind set of planet gears.

Accordingly, the gearbox may include two power paths. A first power path may pass through the upwind set of planet gears 320 and a second power path may pass through the downwind ring gear 328. The upwind set of planet gears may drive the sun gear 326 and the downwind ring gear may drive the downwind set of planet gears 330, which in turn may drive the sun gear. Therefore, both of the power paths pass through and recombine at the sun gear 326. By designing a gearbox with two power paths, the weight as well as the size gearbox may be reduced, allowing for a compact and efficient design.

Furthermore, the sun gear may be coupled to an output shaft 332, which may be included in an output of the gearbox or gear-train. A rear bearing 334 (or bearing set) may be coupled to the output shaft, facilitating rotation of the output shaft. In some examples, the output shaft may lead to a parallel stage shaft (not shown), which may be included in the output of the gearbox. However, in other examples, the output shaft may lead to another suitable component included in the output of the gearbox.

The gearbox may further include a lubrication system 336 configured to deliver oil to various components included in the gearbox. The lubrication system may include a rear lubrication manifold 338, which may be stationary, located in a rear portion of the gearbox.

Additionally, the rear lubrication manifold may be fluidly coupled to a pump 345. The pump may be configured to increase the pressure of the oil in the lubrication system, and direct pressurized oil downstream into the rear lubrication manifold. In this example, the pump 345 is an electrical pump. However, it can be appreciated that other suitable pumps may be utilized. Furthermore, the pump may be coupled to additional components included in the lubrication system. The additional components may include a suitable collection apparatus, such as a sump 346. The sump may collect oil from the gear-train and direct it back to the rear lubrication manifold through a return line 347. In this way, oil may be circulated through the lubrication system. In this example, the sump and the return line are external to the gearbox. However, it can be appreciated that in other examples the sump and/or the return line may be internal components in the gearbox, preventing the line from being damaged or ruptured during installation or repair.

Additional components may be included in the lubrication system, including a closed loop cooling system (not shown) configured to remove heat from the oil. Additionally or alternatively, a filtering system (not shown) may be used to remove unwanted contaminants from the lubrication system. The filtering system may include one or more filters having similar or varying degrees of filtration. In this way, the wear on the gear-train may be decreased by removing unwanted particulates from the lubrication system, thereby increasing the lifespan of the wind turbine.

Figure 3E:
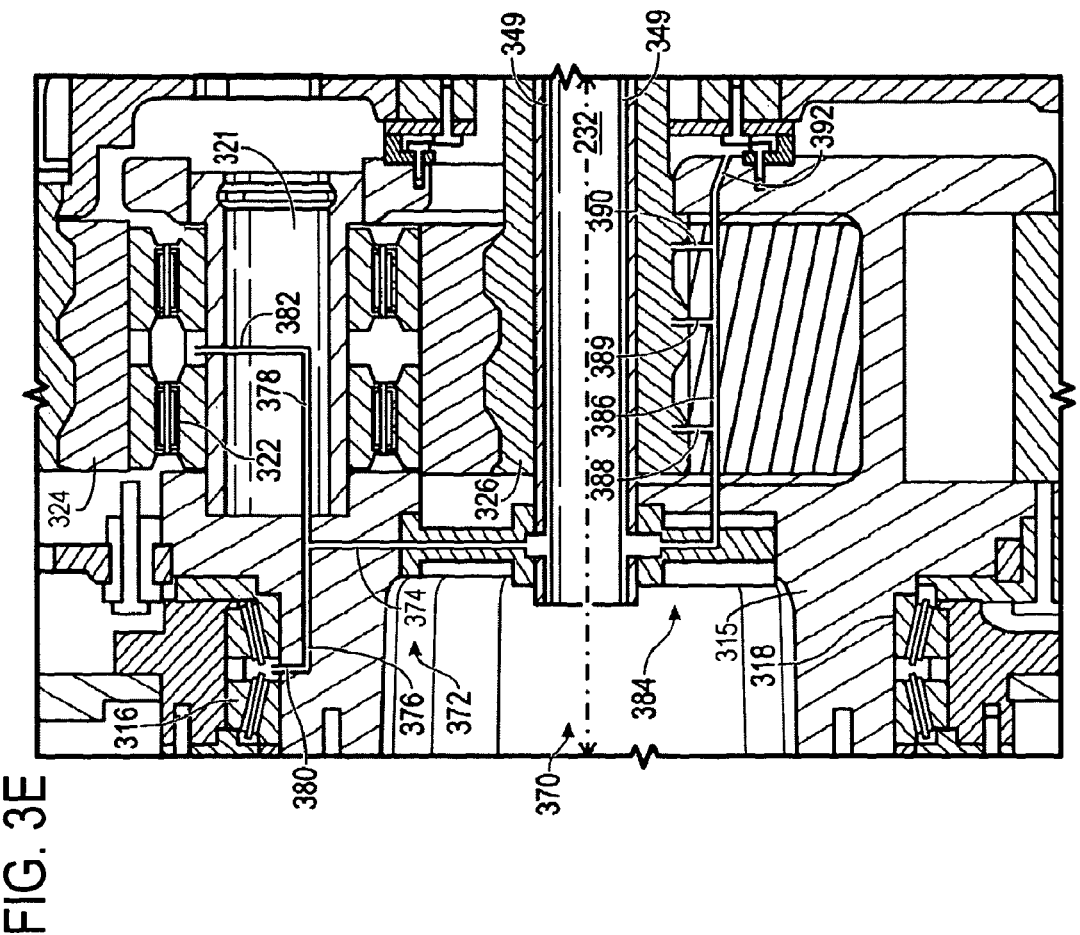
FIG. 3E illustrates an expanded upwind lubrication manifold included in the gearbox shown in FIG. 3A.
Figure 3B:
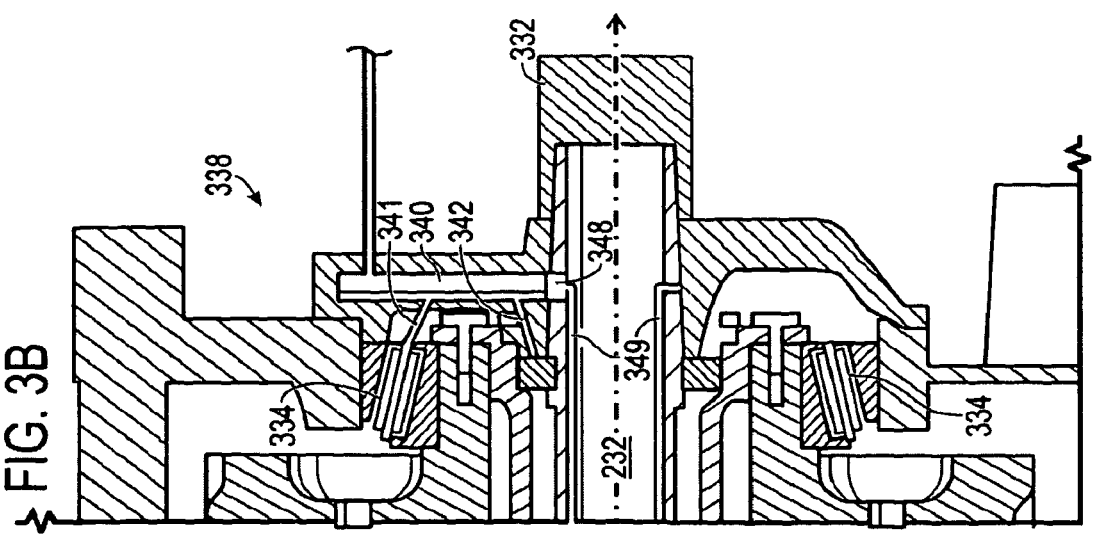
FIG. 3B illustrates an expanded view of a rear lubrication manifold included in the gearbox shown in FIG. 3A.

FIG. 3B illustrates an enlarged view of the rear lubrication manifold. The rear lubrication manifold 338 may be configured to deliver oil to the rear bearing 334 and/or other suitable components included in the gear-train. The rear lubrication manifold 338 may include a feed line 340, which may be stationary. In this example, the feed line is radially positioned. However, in other examples, the position of the feed line 340 may be adjusted depending on various design requirements. The feed line may be fluidly coupled to a first and a second downwind bearing lubrication line, 341 and 342 respectively. The first and the second downwind bearing lubrication lines may extend towards the rear bearings, thereby providing the rear bearing with oil. In this example, the diameter of the first and second downwind lubrication lines (341 and 342) may be smaller than the feed line 340. However, it can be appreciated that in other examples the size, geometry, etc., of the first downwind lubrication line, second downwind lubrication line, and/or feed line may be altered. Further, in other examples, additional lubrication lines may be included in the rear lubrication manifold.

Continuing with FIG. 3B, a hydraulic union 348, which may be stationary, is fluidly coupled to the rear lubrication manifold. The hydraulic union may be configured to transfer oil from the rear lubrication manifold to a rotating lubrication channel 349, surrounding the pitch tube. In this example, the hydraulic union 348 may extend around the periphery of the outer tube 350. However, in other examples, the hydraulic union 348 may only extend around a portion of the rotating conduit. The rotating lubrication channel may rotate at the same speed as the rotor head 24, illustrated in FIGS. 1 and 2. Continuing with FIG. 3B, the rear lubrication manifold and the rotating lubrication channel may rotate at different speeds. Rotating at different speeds includes one non-moving component and one rotating component, for example. Therefore, oil may be directed downstream into the rotating lubrication channel from a stationary component. The rotating lubrication channel may direct oil in an axial (e.g. upwind) direction to various components in the gearbox.

FIGS. 3C and 3D illustrate a detailed view of the rotating lubrication channel 349. An outer tube 350, or other suitable rotating conduit, may surround at least a portion of the pitch tube 232, thereby forming a tube-in-tube assembly 351. In this example, the annulus of the tube-in-tube assembly is the lubrication channel. It can be appreciated that in other examples other configurations are possible, such as a configuration in which the pitch tube surrounds the lubrication channel and a configuration in which the tubes are not concentric. Furthermore, the shape of the tubes may be cylindrical or may have another suitable geometry.

In this example, the pitch tube 232 and the outer tube 350 rotate at the same speed and are joined through a suitable coupling apparatus, such as a slip coupling (not shown). However, in other examples, the pitch tube 232 and the outer tube may rotate at different speeds. The pitch tube may form an inner channel 352 housing various electrical wires, as discussed above, separated from the oil in the lubrication channel. Therefore, oil may be directed down the lubrication channel in an axial (e.g. upwind) direction to various gearbox components without interfering with the pitch control system.

Returning to FIG. 3A, various distribution manifolds may be fluidly coupled to the lubrication channel 349, configured to deliver oil to various components included in the gearbox 310. The distribution manifolds may include an intermediate lubrication manifold 360 as well as an upwind distribution manifold 370. The intermediate lubrication manifold may include various lubrication lines configured to deliver oil to the gear mesh between the downwind set of planet gears 330 and the sun gear 326. The lubrication lines, included in the intermediate lubrication manifold, may extend in a radial direction away from the lubrication channel 349.

FIG. 3E illustrates a detailed view of the upwind distribution manifold 370 as well as various lubrication lines configured to deliver oil to various components in the gear-train 312, downstream of the pitch tube 232, included in the upwind distribution manifold. The upwind distribution manifold may rotate at the same speed as the tube-in-tube assembly. The lubrication lines may include bearing lubrication lines 372 facilitating delivery of oil to the input bearing 316 and/or the upwind planet bearings 322. In some examples, the bearing lubrication lines 372 may be routed through the input carrier 315 via internal plumbing. However, in other examples, the bearing lubrication lines may be routed around the input carrier. In particular, the bearing lubrication lines may include a main conduit 374 extending radially away from the pitch tube. A first branch conduit 376 may extend towards the input bearing and a second branch conduit 378 may extend toward the upwind planet bearing. The first branch conduit 376 may be coupled to an input bearing port 380. The input bearing port may direct oil into the center of the bearing between two sets of rollers. The second branch conduit 378 may be coupled to an upwind planet bearing port 382. The input bearing port 380 and/or the upwind planet bearing port 382 may include nozzles, orifices, or other suitable devices configured to direct oil into various components.

Additionally, gear lubrication lines 384 may be included in the upwind distribution manifold 370, configured to deliver oil to the gear mesh between upwind set planet gears 320 and the sun gear 326. The gear lubrication lines may include a main conduit 386, first extending radially away from the pitch tube, and then axially downwind. Three gear ports, 388, 389, and 390 respectively, may extend radially away from the main conduit 386. A fourth gear port 392 may also be included in the upwind lubrication manifold. It can be appreciated that in other examples the geometry, size, and/or positioning of the upwind distribution manifold, bearing lubrication lines, etc., may be altered based on various parameters, such as the lubrication requirements, type of gearbox in use, etc. Also, the aforementioned ports may include nozzles, orifices, or other suitable devices configured to direct oil into various gearbox components.

The various examples of the disclosed lubrication system allow external lubrication lines to be eliminated in the upwind portion of the gearbox, if desired. Therefore, degradation and possible rupture of the oil lines during installation or maintenance, due to human error, may be reduced. In this way, the longevity of the gearbox may be increased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A gearbox comprising:
a planetary gear-train including an upstream input and a downstream output, the input receiving rotational input and transferring the rotational input to one or more planet gears included in the gear-train downstream of the input, the planet gears in meshing engagement with a sun gear coupled to the output;
a rotating conduit internally traversing the gear-train, the rotating conduit configured to receive lubrication fluid from one or more components downstream of the rotating conduit and deliver lubrication fluid to one or more components upstream of the rotating conduit, wherein the components upstream of the rotating conduit rotate at a different speed than the components downstream of the rotating conduit.

2. The gearbox of claim 1 wherein the input and the output of the gear-train are axially aligned.

3. The gearbox of claim 1 further comprising at least one lubrication manifold configured to direct lubrication fluid radially outward from the rotating conduit into at least one moving component in the gearbox.

4. The gearbox of claim 1 further comprising a housing, surrounding at least a portion of the gear-train, configured to impede lubrication fluid from exiting the gear-train.

5. The gearbox of claim 1 wherein the components downstream of the rotating conduit are stationary.

6. The gearbox of claim 5 wherein the components downstream of the rotating conduit include a feed line fluidly coupled to a pump, the pump configured to increase the pressure of the lubrication fluid.

7. The gearbox of claim 6, wherein the feed line is coupled to a rear bearing via one or more bearing lubrication lines, the rear bearing and the sun gear coupled to an output shaft of the output.

8. The gearbox of claim 5 wherein the components downstream of the rotating conduit are coupled to the rotating conduit through a hydraulic union, the hydraulic union configured to transfer lubrication fluid from the components downstream of the rotating conduit into a lubrication channel within the rotating conduit.

9. The gearbox of claim 1 wherein the lubrication channel surrounds at least a portion of the second channel.

10. The gearbox of claim 9 wherein the lubrication channel and the second channel are concentrically arranged.

* * * * *